(12) United States Patent
Segev et al.

(10) Patent No.: US 9,072,090 B2
(45) Date of Patent: Jun. 30, 2015

(54) METHOD AND APPARATUS FOR MANAGING A WIRELESS NETWORK ACCESS POINT BEACON

(71) Applicants: Jonathan Segev, Tel Mond (IL); Adrian P. Stephens, Cambridge (GB)

(72) Inventors: Jonathan Segev, Tel Mond (IL); Adrian P. Stephens, Cambridge (GB)

(73) Assignee: INTEL CORPORATION, Santa Clara, CA (US)

( * ) Notice: Subject to any disclaimer, the term of this patent is extended or adjusted under 35 U.S.C. 154(b) by 149 days.

(21) Appl. No.: 13/716,380

(22) Filed: Dec. 17, 2012

(65) Prior Publication Data

US 2013/0235813 A1 Sep. 12, 2013

Related U.S. Application Data

(60) Provisional application No. 61/607,235, filed on Mar. 6, 2012.

(51) Int. Cl.
| | |
|---|---|
| *H04J 1/16* | (2006.01) |
| *H04W 4/00* | (2009.01) |
| *H04W 72/04* | (2009.01) |
| *H04W 48/12* | (2009.01) |
| *H04W 72/12* | (2009.01) |
| *H04W 88/08* | (2009.01) |

(52) U.S. Cl.
CPC .......... *H04W 72/042* (2013.01); *H04W 72/044* (2013.01); *H04W 72/12* (2013.01); *H04W 72/1284* (2013.01); *H04W 88/08* (2013.01); *H04W 48/12* (2013.01)

(58) Field of Classification Search
USPC .................................. 370/252, 328, 329, 338
See application file for complete search history.

(56) References Cited

U.S. PATENT DOCUMENTS

| | | | | |
|---|---|---|---|---|
| 2007/0026880 | A1* | 2/2007 | Doi et al. ...................... | 455/502 |
| 2008/0285514 | A1* | 11/2008 | Uchida et al. ................. | 370/329 |
| 2009/0046625 | A1* | 2/2009 | Diener et al. ................. | 370/319 |
| 2009/0232105 | A1* | 9/2009 | Kesselman et al. ........... | 370/336 |
| 2009/0310503 | A1* | 12/2009 | Tenny et al. .................. | 370/252 |
| 2010/0085930 | A1* | 4/2010 | Shin et al. ..................... | 370/329 |
| 2010/0165872 | A1* | 7/2010 | Jiang ............................. | 370/253 |
| 2011/0090939 | A1* | 4/2011 | Diener et al. ................. | 375/136 |
| 2011/0299509 | A1* | 12/2011 | Wang et al. ................... | 370/336 |
| 2012/0176955 | A1* | 7/2012 | Ishii et al. .................... | 370/315 |
| 2012/0218976 | A1* | 8/2012 | Kesselman et al. ........... | 370/336 |
| 2013/0028177 | A1* | 1/2013 | Koskela et al. ............... | 370/328 |
| 2013/0035033 | A1* | 2/2013 | Sanneck et al. .................. | 455/9 |

* cited by examiner

*Primary Examiner* — Andrew Lee

(74) *Attorney, Agent, or Firm* — Ellis B. Ramirez; Prass LLP (57) ABSTRACT

An approach is provided for managing a wireless network access point beacon. The approach involves determining to one or more of (1) cause, at least in part, a beacon pointer associated with a beacon of a wireless network access point to be transmitted and (2) cause, at least in part, a beacon schedule associated with the beacon of the wireless network access point to be adjusted based, at least in part, on a derivation of one or more other beacon schedules associated with one or more other beacons of one or more other wireless network access points. The determination to cause the adjustment of the beacon schedule is based, at least in part, on a received indication of a potential conflict between the beacon and the one or more other beacons.

36 Claims, 7 Drawing Sheets

METHOD AND APPARATUS FOR MANAGING A WIRELESS NETWORK ACCESS POINT BEACON

RELATED APPLICATIONS

This application claims the benefit of the earlier filing date of U.S. Provisional Application Ser. No. 61/607,235 filed Mar. 6, 2012, entitled "Techniques for Fast Initial Link Setup," the entirety of which is incorporated herein by reference, under 35 U.S.C. §119(e).

BACKGROUND

Service providers and device manufacturers (e.g., wireless, cellular, etc.) are continually challenged to deliver value and convenience to consumers by, for example, providing compelling network services. Wireless networks, such as those specified by various IEEE 802.11 standards (e.g., IEEE 802.11 standard, published Jun. 12, 2007, and beyond) for example, employ links between devices to communicate information. Procedures involving the initial setup of these links are important to such wireless networks.

Wireless network access points often provide a beacon that may include access point identification and capability information. Dense beacons often crowd an available wireless medium making the initial link setup inefficient and/or crippling ongoing links because beacons usually includes additional broadcast or multicast information.

Though 802.11 based networks often support active scanning in which a device transmits an unsolicited discovery message (e.g. a probe request message) to discover a wireless network access point, active scanning is often limited by geographical regulations that prevent the device from performing any type of transmission prior to a reception of a message from an available wireless network access point (e.g. a beacon, measurement pilot, FILS frame discovery, etc.).

Additionally, some wireless network access points use local unsynchronized clocks that are only accurate to a certain extent (e.g. 20 ppm for 20 Mhz OFDM 802.11g technology). As such, various beacon schedules that correspond to respective wireless network access points may constantly and unforeseeably shift in relation to one another, especially when one or more wireless network access points are not part of a same network.

SOME EXAMPLE EMBODIMENTS

Therefore, there is a need for an approach to manage a wireless network access point beacon to enable efficient wireless network access point discovery and initial link setup.

According to one embodiment, a method comprises determining to one or more of (1) cause, at least in part, a beacon pointer associated with a beacon of a wireless network access point to be transmitted and (2) cause, at least in part, a beacon schedule associated with the beacon of the wireless network access point to be adjusted based, at least in part, on a derivation of one or more other beacon schedules associated with one or more other beacons of one or more other wireless network access points to avoid a conflict between the beacon schedule and the one or more other beacon schedules. The determination to cause the adjustment of the beacon schedule is based, at least in part, on one or more of a determined conflicting beacon schedule and a received indication of a potential conflict between the beacon and the one or more other beacons.

According to another embodiment, an apparatus comprises at least one processor, and at least one memory including computer program code for one or more computer programs, the at least one memory and the computer program code configured to, with the at least one processor, cause, at least in part, the apparatus to determine to one or more of (1) cause, at least in part, a beacon pointer associated with a beacon of a wireless network access point to be transmitted and (2) cause, at least in part, a beacon schedule associated with the beacon of the wireless network access point to be adjusted based, at least in part, on a derivation of one or more other beacon schedules associated with one or more other beacons of one or more other wireless network access points to avoid a conflict between the beacon schedule and the one or more other beacon schedules. The determination to cause the adjustment of the beacon schedule is based, at least in part, on one or more of a determined conflicting beacon schedule and a received indication of potential conflict between the beacon and the one or more other beacons.

According to another embodiment, a computer-readable storage medium carries one or more sequences of one or more instructions which, when executed by one or more processors, cause, at least in part, an apparatus to determine to one or more of (1) cause, at least in part, a beacon pointer associated with a beacon of a wireless network access point to be transmitted and (2) cause, at least in part, a beacon schedule associated with the beacon of the wireless network access point to be adjusted based, at least in part, on a derivation of one or more other beacon schedules associated with one or more other beacons of one or more other wireless network access points to avoid a conflict between the beacon schedule and the one or more other beacon schedules. The determination to cause the adjustment of the beacon schedule is based, at least in part, on one or more of a determined conflicting beacon schedule and a received indication of a potential conflict between the beacon and the one or more other beacons.

Exemplary embodiments are described herein. It is envisioned, however, that any system that incorporates features of any apparatus, method and/or system described herein are encompassed by the scope and spirit of the exemplary embodiments.

BRIEF DESCRIPTION OF THE DRAWINGS

The embodiments are illustrated by way of example, and not by way of limitation, in the figures of the accompanying drawings.

DESCRIPTION OF SOME EMBODIMENTS

Examples of a method, apparatus, and computer program for managing a wireless network access point beacon to enable efficient wireless network access point discovery and initial link setup are disclosed. In the following description, for the purposes of explanation, numerous specific details are set forth in order to provide a thorough understanding of the embodiments. It is apparent, however, to one skilled in the art that the embodiments may be practiced without these specific details or with an equivalent arrangement. In other instances, well-known structures and devices are shown in block diagram form in order to avoid unnecessarily obscuring the embodiments.

References to "one embodiment," "an embodiment," "example embodiment," "various embodiments," etc., indicate that the embodiment(s) so described may include a particular feature, structure, or characteristic. Further, repeated uses of the phrase "in one embodiment" does not necessarily refer to the same embodiment, although it may.

As used herein, unless otherwise specified, the use of ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As used herein, the term wireless network access point refers to any wireless network access point, station, user equipment, mobile device, soft access point, soft station, soft user equipment, etc. that may be configured to transmit a wireless signal.

As used herein, the term beacon, or any derivation thereof, refers to one or more signaling frames (i.e. management, control or extended control frames) that are periodically transmitted to announce the presence of a wireless network access point with which the beacon is associated and provide information about the associated wireless network access point.

As used herein, the term beacon pointer, or any derivation thereof, refers to a communication that includes beacon information such as beacon scheduling information and/or wireless network access point information communicated by way of a traffic frame other than the beacon frame.

Figure 1:
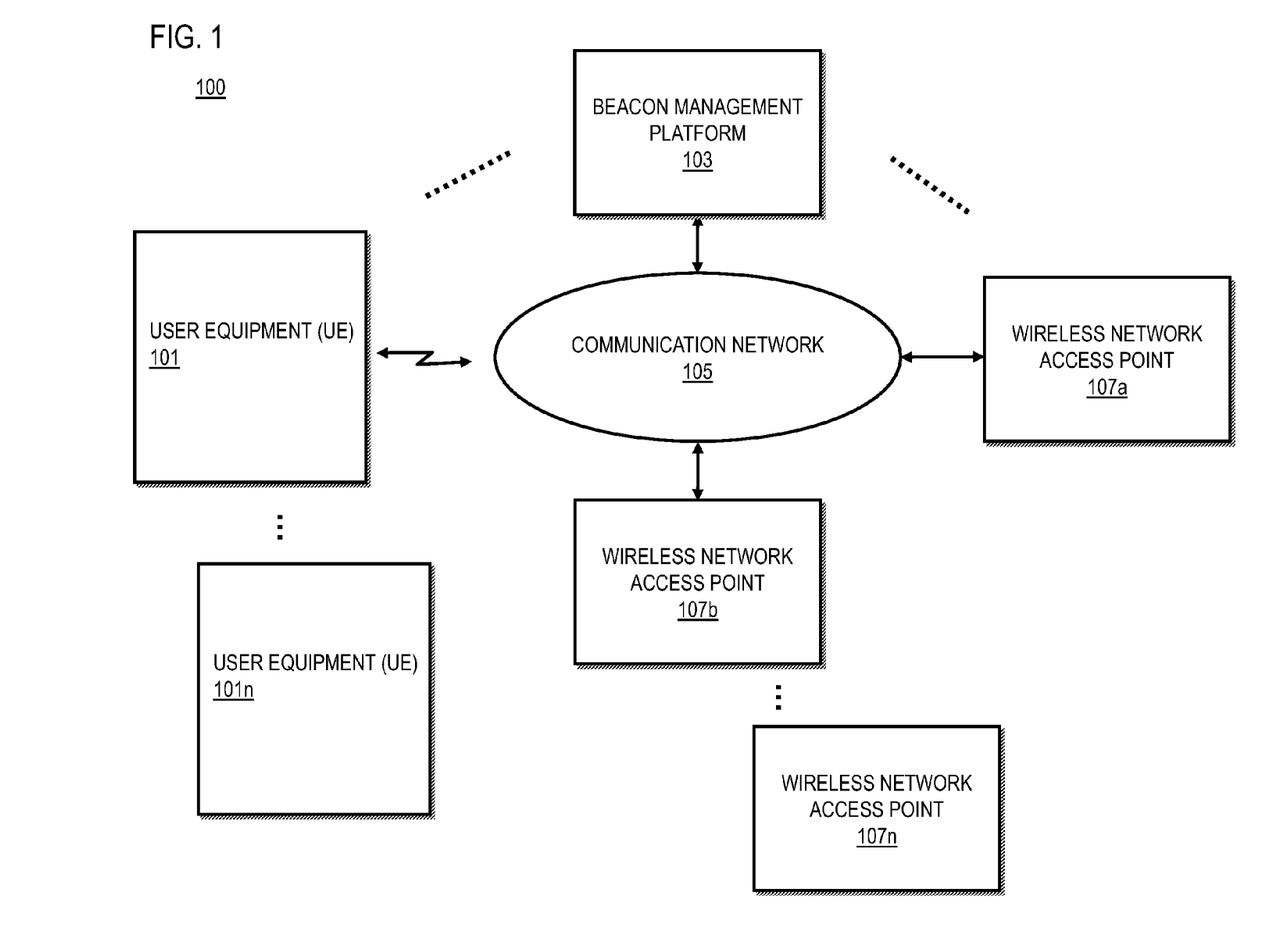
FIG. 1 is a diagram of a system capable of managing a wireless network access point beacon to enable efficient wireless network access point discovery and initial link setup, according to one embodiment.

FIG. 1 is a diagram of a system 100 capable of managing a wireless network access point beacon to enable efficient wireless network access point discovery and initial link setup, according to one embodiment.

The number of mobile devices fully or partially incorporating IEEE 802.11 capabilities is steadily growing. Applications that are continuously running on those devices benefit from the high data rates of the IEEE 802.11 interface. Mobile device users are constantly entering and leaving various coverage areas of an extended service set, for example. Every time the mobile device enters an extended service set, the mobile device has to do an initial link setup to establish wireless network connectivity. Wireless networks, such as those specified by various IEEE 802.11 standards for example, employ links between devices to communicate information. As such, procedures involving the initial setup of these links are important to such wireless networks. Efficient initial link setup, which may also be labeled "Fast Initial Link Setup" is discussed, for example, in the Fast Initial Link Setup Task Group 802.11ai PAR document (IEEE 802.11-10/1152r1, published September 2010), among others.

Passive scanning by mobile devices is hindered by the requirement for long durations of baseband receiving in order to identify a beacon associated with an available wireless network access point. Dense beacons and/or dense measurement pilots have a toll of distributed inter-frame space associated with each, bringing a wireless medium by which the mobile device may send and receive transmissions to a high occupancy level.

Thus, a compromise is conventionally taken that includes having a fixed cycle of beacon and measurement pilots such that the wireless medium is not overly occupied during times of peak usage while still providing sufficient beacons for wireless network access point discovery. The fixed cycle of the beacons, for example, also enables supporting of broadcast services where mobile devices abstain from communicating with a wireless medium for various durations of time. While abstaining from the wireless medium, the device only decodes a short preknown duration of a Delivery Traffic Indication Map (DTIM) beacon which often appears on an interval such as, for example, every pre-known integer of multiple regular beacons.

But, wireless network access points often use local oscillators or clocks that, in most cases, are not synchronized with one another. Synchronization of local oscillators or clocks of multiple wireless network access points is a very complex process, or simply cannot be done, because the wireless network access points are deployed by different sources. As a result, there are frequency deviations between the various wireless network access points that share physical coverage areas. Additionally, frequency deviation may occur and may not be accounted for in a local oscillator or clock synchronization attempt if two wireless network access points, for example, are each capable of communicating with a same wireless device, but not capable of communicating with one another. For example, the inability to communicate may be for any reason such as, but not limited to, geographic limitations, security implementations, transmission strength, etc.

The above-discussed frequency deviations cause a timing drift between the wireless network access points deployed over the same wireless medium, which in turn causes a clock drift that causes the wireless network access point timing to shift. In some instances, multiple wireless network access points may not be part of the same network (e.g., extended service set, basic service set, etc.) and thus may not have a shared backbone or distribution system to make synchronization possible.

Accordingly, beacon timing of any two wireless network access points may slowly, but constantly, shift in their timing relation. Eventually, any beacons transmitted by the multiple wireless network access points may partially, or completely, collide. When a collision occurs, a mobile device attempting a beacon decoding process that is in a coverage area of the multiple wireless network access points is likely to suffer substantial errors. These errors prevent the mobile device from decoding the beacons and will continue until a partial or complete collision passes because the beacons associated with the multiple wireless network access points are in conflict.

Conventionally, beacon conflicts may be partially avoided if one wireless network access point detects a beacon transmission prior to its own beacon transmission. The detecting wireless network access point may, accordingly, delay the timing of its beacon transmission until the wireless medium is determined to be vacant from any interfering transmissions. However, this mechanism requires the wireless network access point to be able to identify a neighboring wireless network access point which, in many cases, is not possible. For example, identifying a neighboring wireless network access point may not be possible if two wireless network access points cannot communicate with one another for any reason, or if two wireless network access points are operating on channels that may be partially overlapping. For example in a case where a first wireless network access point operates on channels 1 and 2 in 2.5 Ghz, and a second wireless network access point operates on channels 1 and 3 in 2.4 Ghz, the operating channels of the first and second wireless network access points are overlapping. Overlapping channels interfere with one another even though the transmissions cannot be directly decoded from one channel to the other inhibiting communication between the two wireless network access points.

To address these problems, a system 100 of FIG. 1 introduces the capability to manage a wireless network access point beacon to enable efficient wireless network access point discovery and initial link setup. The system 100 reduces the amount of time a mobile device takes to discover a wireless network access point with which the mobile device was not previously associated (or with which a previous associated was erased from a memory associated with the mobile device), reduces the amount of power consumed while performing and maintaining a scan process for wireless network access point discovery, and reduces wireless medium occupancy to support the mobile device's network entry procedures (e.g. association) and service discovery by employing one or more of a beacon pointer and a beacon scheduling adjustment procedure.

As shown in FIG. 1, the system 100 comprises one or more user equipment (UE) 101*a*-101*n* (collectively referred to as UE 101) having connectivity to a beacon management platform 103 and wireless network access points 107*a*-107*n* (collectively referred to unless otherwise specified as wireless network access point 107) via a shared medium 105. The beacon management platform 103 though illustrated as being a single separate entity from the UE 101 and the wireless network access point 107 may be additionally or alternatively embodied in one or more of the UE 101's and/or the wireless network access points 107. As such, the association between the beacon management platform 103 and the UE 101 and/or the wireless network access point 107 is illustrated as being an optional integration or direct communication. Regardless of arrangement, the beacon management platform 103 either has direct connectivity to the shared medium 105 or has connectivity to the shared medium 105 by way of the UE 101 or the wireless network access point 107.

The UE 101 is any type of mobile device, mobile terminal, station, fixed terminal, or portable terminal including a mobile handset, station, unit, device, multimedia computer, multimedia tablet, Internet node, network access point, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the shared medium 105 of system 100 includes any communication medium available by way of, for example, one or more networks such as a wired data network, a wireless network, a telephony network, or any combination thereof. It is contemplated that the data network may be any local area network (IAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), and the like, or any combination thereof.

According to various embodiments, the beacon management platform 103 is configured to provide one or more beacon pointers associated with one or more beacons transmitted by a wireless network access point 107. The beacon management platform 103 may cause the beacon pointers to be transmitted by the wireless network access point 107, for example, using regular downlink traffic (e.g. management, control, and data frames) frames as well as uplink traffic frames. The beacon pointers may carry pointers to a delivery traffic indication map interval and/or carry other signaling information such as a wireless network access point 107's capabilities that may be regularly transmitted over a beacon associated with the wireless network access point 107. If the beacon pointer is configured to include information that may regularly be included in a beacon transmission, a beacon associated with a wireless network access point 107 may also include this information, or the beacon may be stripped of this information to make the beacon less dense, and therefore less wireless medium and time intensive.

Signaling carried over an already existing management, control, and data traffic uses the overhead already associated with the original traffic frames thus has a much lower impact on the wireless medium occupancy. For example, if the beacon pointer includes information such as, but not limited to, beacon scheduling, wireless network access point 107 identification information and/or capabilities, this data could be included in already existing traffic frames and need not be included in the beacon transmitted by the wireless network access point 107. Accordingly, a beacon transmitted without this information may be less wireless medium intensive.

Alternatively, the beacon management platform 103, depending on any of a preset preference at the beacon management platform 103, a received instruction from the UE 101, and/or a determined signaling rate value and a determined wireless medium occupancy level, the beacon management platform 103 may cause the beacon pointer to be transmitted in a dedicated message if an occupancy level of the wireless medium allows rather than incorporating the beacon pointer into existing traffic.

For example, in one or more embodiments, the beacon management platform 103 may dynamically control the balance of signaling carried over various existing traffic frames as opposed to various dedicated frames. If the beacon management platform 103 determines that the wireless medium occupancy is above a threshold level based, for example, on current traffic frames and/or beacons, etc., the beacon management platform 103 may employ a broadcasting probability mechanism that affects the probability by which the beacon management platform 103 causes the beacon pointer to be transmitted on one or more existing traffic frames rather than by way of a dedicated message. For example, the beacon management platform 103 may cause the beacon pointer to be transmitted on every other or more than every other traffic frame so that wireless medium is not overly occupied in future cycles during which a beacon pointer may be transmitted. In other words, the beacon management platform 103 may change the rate the beacon pointer occurs in ordinary traffic frames as opposed to a dedicated message based on the determined rate of packet transmission within its coverage that can carry this scheduling or broadcast information and a wireless medium occupancy level. The beacon management platform 103 uses the beacon pointer to indicate the probability of adding a future beacon pointer to ordinary traffic frames on another link setup cycle.

For example, the probability controlling mechanism may affect the transmission of the beacon pointer as follows:

The wireless network access point 107 may broadcast an integer called, for example, "Signaling Probability Domain," and a value called, for example, "Signaling Probability Threshold" in its broadcasting signaling information. Whenever a UE 101 or a wireless network access point 107 transmits a traffic frame, the beacon management platform 103 selects a variable from an interval such as, for example, [0, Signaling Probability Threshold] with uniform distribution. If the variable is larger or equal to the example Signaling Probability Threshold, the transmitter (i.e. the beacon management platform 103 associated with either the UE 101 or the wireless network access point 107) adds the signaling (e.g., the beacon pointer having beacon scheduling information or other information) to the traffic frame and causes the beacon pointer to be transmitted by the UE 101 or the wireless network access point 107 over the wireless medium using various medium access procedures. By controlling the Signaling Probability Domain and Signaling Probability Threshold, the wireless network access point 107 essentially determines the percentile of traffic frames carrying the broadcast signaling.

In some embodiments, for simplicity, the transmission of the beacon pointer can be limited to a downlink frame and specifically to acknowledgment frames as acknowledgement frames use omni-directional or non-directional wireless medium access in which case the controlling mechanism can be internal or non-implemented. But the transmission of the beacon pointer or any other beacon associated information can be by way of any radio access technology using a shared channel arbitration transmitting broadcast signaling or any unicast addressed frames that include one or more of downlink and uplink unicast frames.

According to various embodiments, the beacon management platform 103 may additionally, or alternatively, be configured to determine a current beacon schedule by which a wireless network access point 107 transmits a beacon associated with the wireless network access point 107. The beacon management platform 103 may also be configured to adjust the current beacon schedule of at least one wireless network access point 107 based, at least in part, on one or more other determined beacon schedules respectively associated with one or more other wireless network access points 107 such as wireless network access points 107b-107n to avoid any collisions or conflicts between the transmitted beacons. For example, the beacon management platform 103 may adjust one wireless network access point 107 beacon schedule, all known or available wireless network access point 107 beacon schedules, or any selected wireless network access point 107 beacon schedules with which the beacon management platform 103 may have communicative connectivity, either directly or indirectly, to optimally avoid beacon collisions and/or beacon schedule conflicts.

In some embodiments, the beacon management platform 103 adjusts the beacon schedule of at least one wireless network access point 107 by deriving a new beacon schedule for the at least one wireless network access point 107 based, at least in part, on the determined one or more other beacon schedules associated with one or more other beacons of the one or more other wireless network access points 107. For example, the derived beacon schedule could simply be an offset schedule having a same beacon occurrence interval as any of the determined beacon schedules of the one or more other wireless network access points 107, but instead having an offset starting time in relation to the the determined beacon schedules of the one or more other wireless network access points.

Alternatively, the derived beacon schedule may be one that has a different beacon occurrence interval than the determined beacon schedules of the one or more other wireless network access points 107. In other words, the derived beacon schedule in this example is not merely offset. For example, if a certain determined beacon for the one or more other wireless network access points 107 is scheduled to occur at every 97 msec (i.e., a prime number) with a clock drift of +20 ppm, the beacon management platform 103 may derive a new beacon schedule for the at least one wireless network access point 107 to be 101 msec (also a prime number) with a clock drift of −20 ppm. In this example, the derived beacon schedule and at least one of the determined beacon schedules would collide every 97*101=9797 iterations or 979.7 sec. Accordingly, once the beacon schedule of the at least one wireless network access point 107 is adjusted to be the derived beacon schedule, the beacon management platform 103 may continually re-adjust the beacon schedule of the at least one wireless network access point 107 to avoid a potential beacon collision as time progresses.

According to various embodiments, the beacon management platform 103 may cause the UE 101 to receive schedule changes of the wireless network access point 107 beacon and adapt its own reception schedule according to this signaling.

In some embodiments, a UE 101 and/or a wireless network access point 107 in communication with one or more wireless network access points 107 may determine that a potential beacon conflict or collision has occurred or may occur in a future time and relay this information in an indication message to the beacon management platform 103 to indicate that a potential conflict may occur in a future beacon cycle. The beacon management platform 103 causes at least one of the wireless network access points 107 to modify its beacon schedule based on any of the above-discussed determined conflicting beacon schedules and/or any received indications of a potential conflict so as to adjust the beacon schedule of the at least one wireless network access point 107 based on a derivation of the beacon schedule(s) of the one or more other wireless network access points 107 to avoid any future collisions or conflicts.

The beacon schedule of a wireless network access point 107 may be changed and accordingly indicated to any UE 101 and/or the one or more other wireless network access points 107 by way of the UE 101 and/or the wireless network access point 107 itself either using broadcast dedicated messages or existing signaling traffic frames, for example. Such scheduling information may be included with the beacon or as a beacon pointer, as discussed above. The rescheduled beacon information may be transmitted on all beacons, beacon pointers, or on a subset of them, e.g. a delivery traffic information map beacon that all UE 101's are mandated to receive and correctly decode.

The beacon management platform 103 may further identify a wireless network access point interfering beacon schedule or cycle and choose a schedule such that the interference occurs infrequently, for example by selecting a change in the beacon schedule based on a nearest prime number of the other wireless network access point beacon schedule to diminish any identical scheduling of the beacon with the one or more other beacons of the one or more other wireless network access points 107.

In some embodiments, one or more wireless network access points 107 may not be able to communicate directly with one another. As such, any changes in the beacon schedule may only occur based on the indication of a potential conflict received from a wireless network node such as a UE 101 or other wireless network access point 107. The received indication of the potential conflict is necessary, in this embodiment, because the wireless network access point 107 and any other wireless network access points 107 cannot communicate their beacon schedules to one another directly, or by way of the beacon management platform 103. Accordingly, the wireless network node acts as an intermediary to process requisite beacon schedules between nearby wireless network access points 107 and provide the indication of a potential conflict to enable smart selection. In such a case, the wireless network node may be configured to process an internal decision to determine what constitutes a beacon collision or schedule conflict and when such a potential conflict should be reported to the beacon management platform 103. Or, the wireless network node may be configured to simply notify the beacon management platform 103 without an internal decision based on other wireless network access point 107 beacon scheduling but rather based on a received notification or request from a wireless network access point 107 or the beacon management platform 103 searching for any beacon schedules that might be known to the wireless network node based, for example, on received beacons or beacon pointers.

In other cases where the wireless network access points 107 may not be able to communicate directly with one another, a first wireless network access point 107*a* may be in communication with a first UE 101*a* and a second wireless network access point 107*b* may be in communication with a second UE 101*b*. The first UE 101*a* and second UE 101*b* may be able to communicate with one another, but the first wireless network access point 107*a* and second wireless network access point 107*b* may not. Accordingly, any determination of a beacon collision or potential conflict between a beacon schedule of the first wireless network access point 107*a* and the second wireless network access point 107*b* may be determined and communicated to the beacon management platform 103 by any of the first UE 101*a* and second UE 101*b* acting as an intermediary between the first wireless network access point 107*a* and the second wireless network access point 107*b*.

According to various embodiments, the wireless network access point 107 may broadcast a threshold value that indicates to a UE 101, or other wireless network access point 107, one or more limits upon which a beacon rescheduling may be based.

In one or more embodiments, the beacon management platform 103 may cause any of the wireless network access point 107 and the UE 101 to provide statistical information about the colliding beacon from the one or more other wireless network access points 107, as well as additional information to minimize the wireless medium occupancy. Such additional information may be included in the indication of the potential conflict between the beacon and the one or more other beacons, or in another message. The additional information may include, for example, one or more of an average timing gap between the beacon and the one or more other beacons of the wireless network access point 107 and the one or more other wireless network access points 107, a carrier to interferer signal ratio between the wireless network access point 107 and the one or more other wireless network access points 107, one or more radio signal strengths respectively associated with the one or more other wireless network access points 107, one or more service set identifications respectively associated with the one or more other wireless network access points 107, one or more basic service set identifications respectively associated with the one or more other wireless network access points 107, and one or more identifiers respectively associated with the one or more other wireless network access points 107.

According to various embodiments, the beacon management platform 103 may also be configured to transmit and/or receive various wireless network access point 107 information, beacon parameters and beacon scheduling information from neighboring cells or already associated wireless networks having optimized scheduling. For example, the beacon management platform 103 may not be limited to optimizing beacon schedules in instances where one or more beacon schedules are adjusted at the same time, but also in instances where multiple wireless network access points 107 already have cooperating beacon schedules. For example, if the beacon schedule of an available or newly discovered wireless network access point 107 needs to be adjusted to cooperate with a group of multiple wireless network access point 107 beacon schedules that have already been adjusted to optimally cooperate, then the beacon management platform 103 may be configured to weigh the adjustments made to the multiple beacon schedules so that the new wireless network access point 107 is caused to adjust its schedule according to what has already been done for the multiple wireless network access points 107 rather than have all or many of the wireless network access points 107 adjust their schedules again. In other words, the many would outweigh the few in this example.

By way of example, the UE 101, beacon management platform 103, and wireless network access point 107 communicate with each other and other components of the shared medium 105 using well known, new or still developing protocols. In this context, a protocol includes a set of rules defining how the network nodes within the shared medium 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
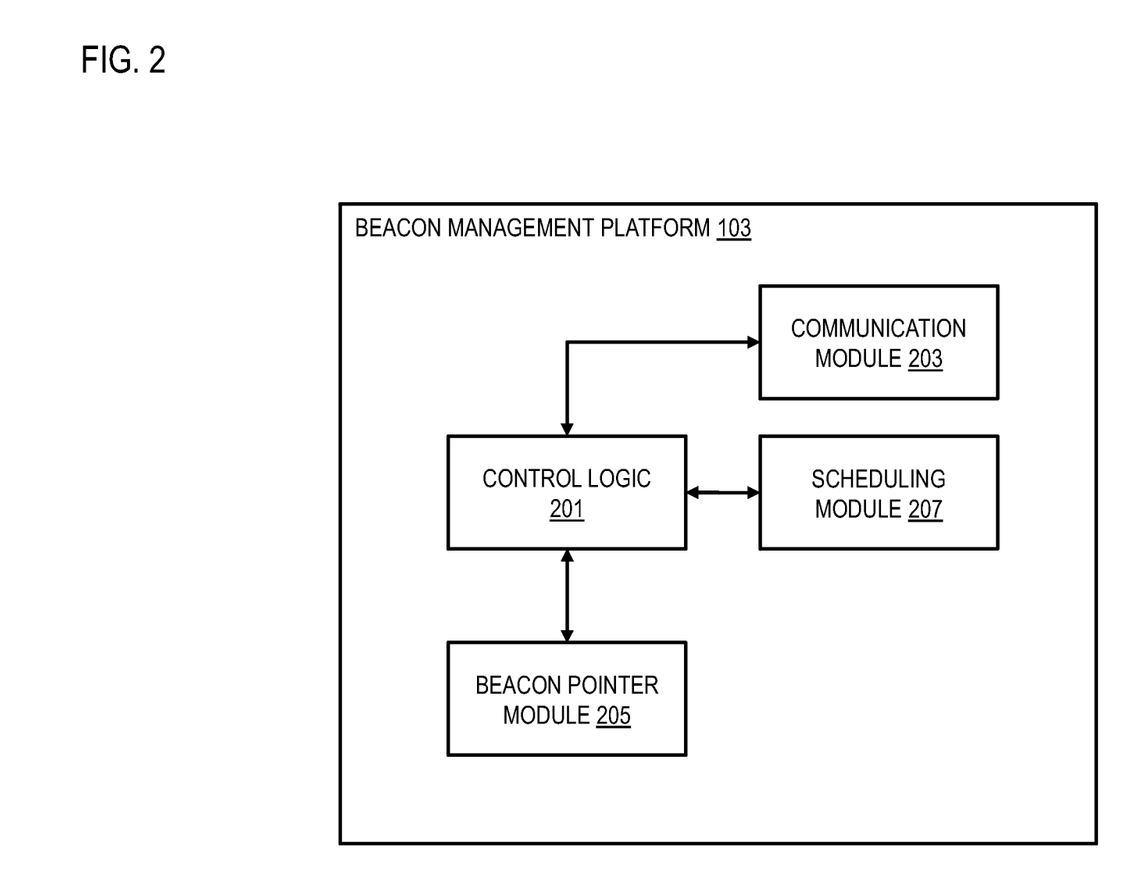
FIG. 2 is a diagram of the components of a beacon management platform, according to one embodiment.

FIG. 2 is a diagram of the components of the beacon management platform 103, according to one embodiment. By way of example, the beacon management platform 103, which as discussed above may be embodied in the wireless network access point 107, in the UE 101, as a stand along entity, or any combination thereof, includes one or more components for managing a wireless network access point beacon to enable efficient wireless network access point discovery and initial link setup. It is contemplated that the functions of these components may be combined in one or more components or performed by other components of equivalent functionality. In this embodiment, the beacon management platform 103 includes a control logic 201, a communication module 203, a beacon pointer module 205 and a scheduling module 207.

According to various embodiments, the beacon management platform 103 may determine by way of the beacon pointer module 205 whether to transmit a beacon pointer based on information received by way of the communication module 203 including, but not limited to an average broadcast and multicast signaling rate and a wireless medium occupancy level. If the broadcast and multicast signaling rate are sufficient for the current beacon associated with the wireless network access point 107 based on a predetermined criteria, then the beacon pointer module 205 elects to not transmit a beacon pointer to reduce wireless medium occupancy. Such a decision is communicated to the control logic 201. The control logic 201 then instructs the communication module 203 to communicate a message to the wireless network access point 107 to continue transmitting a beacon. The predetermined criteria may be any value or combination of values set by a user, or optimized over time by the beacon pointer module 205 based on a compilation of historical beacon and wireless medium occupancy related information, to best use available wireless medium and facilitate fast initial link setup.

But, if the beacon pointer module 205 determines that the average broadcast and multicast signaling rate fails to meet the predetermined criteria, then the beacon pointer module 205 determines an occupancy level of the wireless medium surrounding the wireless network access point 107.

The beacon pointer module 205 then determines if the wireless medium occupancy is below a threshold level. The threshold level may be any value or combination of values set by a user, or optimized over time by the beacon pointer module 205 based on a compilation of historical beacon and wireless medium occupancy related information, to best use available wireless medium and facilitate fast initial link setup.

If the wireless medium occupancy is below the threshold level, then the beacon pointer module 205 communicates to the control logic 201 that a beacon pointer may be transmitted in a dedicated message as opposed to being transmitted by way of any already existing traffic frames. Accordingly, the control logic 201 instructs the communication module 203 to communicate this information to the wireless network access point 107 and therefore cause the wireless network access point 107 to transmit a beacon pointer by way of a dedicated message.

However, if the wireless medium occupancy is above the threshold level, then the beacon pointer module 205 communicates to the control logic 201 that a beacon pointer may be transmitted by way of any already existing traffic frames to reduce the occupancy of the wireless medium. Alternatively, the beacon pointer module 205 may increase the probability that a future beacon cycle adds a beacon pointer to any already existing traffic frames to reduce the occupancy of the wireless medium in future beacon cycles. In either case, the control logic 201 instructs the communication module 203 to communicate this information to the wireless network access point 107 and therefore cause the wireless network access point 107 to transmit a beacon pointer by way of an existing traffic frame in this cycle or potentially, based on the effect of the increased probability adjustment, in a future beacon cycle.

In one or more embodiments, the scheduling module 207 may receive an indication that a beacon schedule has occurred (i.e., a determined conflicting beacon schedule), or of a potential conflict between a beacon associated with the wireless network access point 107 and one or more other beacons associated with one or more other wireless network access points 107. The scheduling module 207 receives this indication by way of the communication module 203 and the control logic 201.

The scheduling module 207 determines a current beacon schedule of the wireless network access point 107 and adjusts the beacon schedule of the wireless network access point 107 based on a derivation of the one or more other beacons associated with the one or more other wireless network access points 107 to prevent or limit any future collisions between the beacon and the one or more other beacons. The scheduling module 207 communicates the modified beacon schedule to the control logic 201 which instructs the communication module 203 to communicate the adjusted beacon schedule to the wireless network access point 107. Similarly, the scheduling module 207 may cause the beacon schedules of the wireless network access point 107 and some or all of the one or more other wireless network access points 107 to each be adjusted to that all of the beacon schedules are optimally modified to cooperate with one another.

According to various embodiments, the control logic 201 may also cause the modified beacon schedule to be included in a beacon pointer generated by the beacon pointer module 205 so that the modified beacon schedule it communicated by way of the communication module and the wireless network access point 107 to any UE 101 and/or other wireless network access point 107 that may be capable of communicating with the wireless network access point 107. If, however, the wireless network access point 107 and the one or more other wireless network access point 107's are not able to communicate directly, such indication of the modified beacon schedule may be caused to be communicated to the one or more other wireless network access points 107 by the beacon management platform 103 by way of the UE 101.

In some embodiments, the beacon management platform 103, based on an adjusted beacon schedule determined by the scheduling module 207, may cause the UE 101 to adapt its own reception schedule to coincide with the modified beacon schedule. Additionally, the beacon management platform 103 may facilitate the communication of any optimized beacon schedules among one or more wireless network access points 107 to any other groups or cells of other wireless network access points 107 that may have optimized beacon schedules of their own, or that may have entirely independent beacon schedules.

Figure 3:
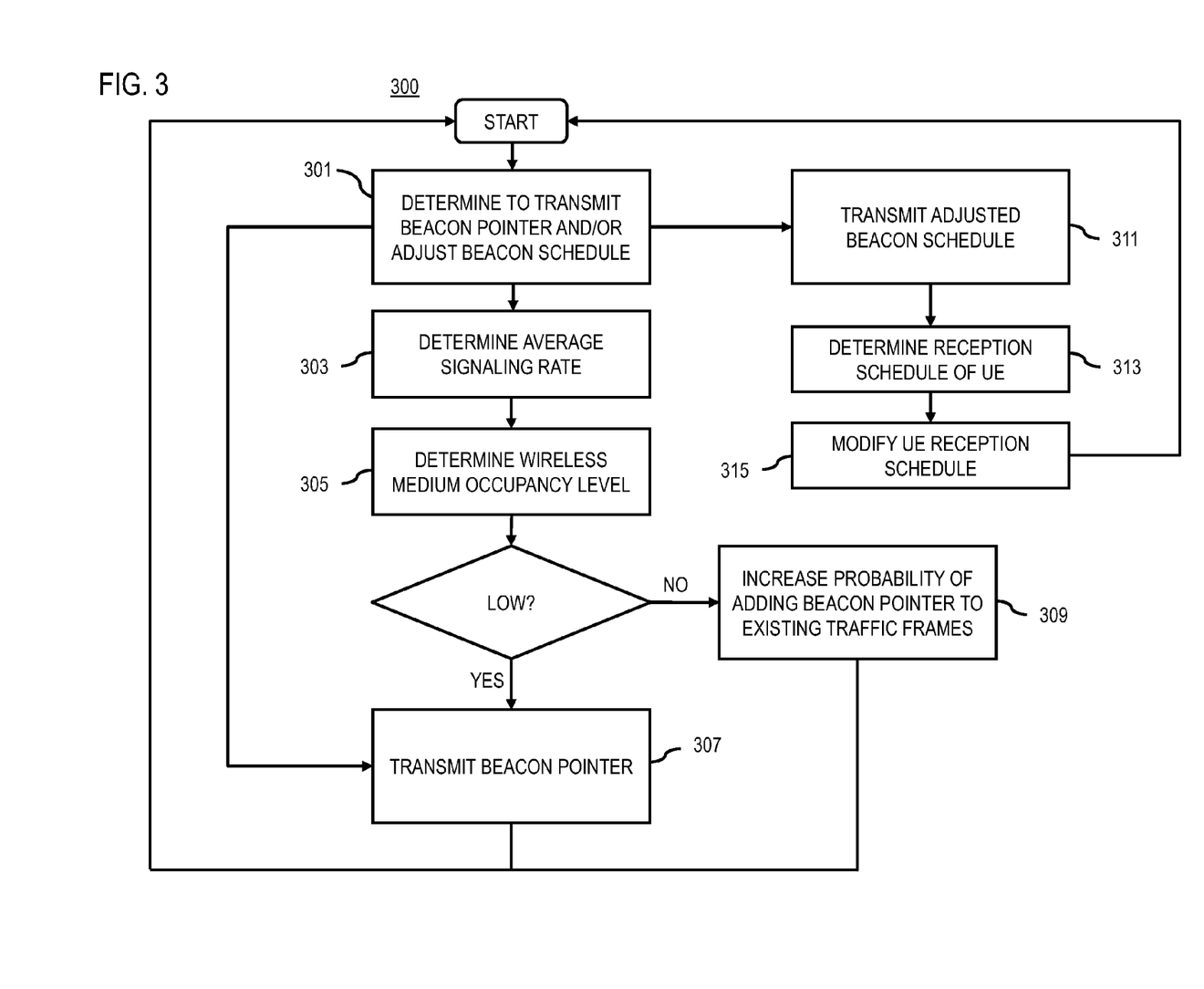
FIG. 3 is a flowchart of a process for managing a wireless network access point beacon to enable efficient wireless network access point discovery and initial link setup, according to one embodiment.
Figure 7:
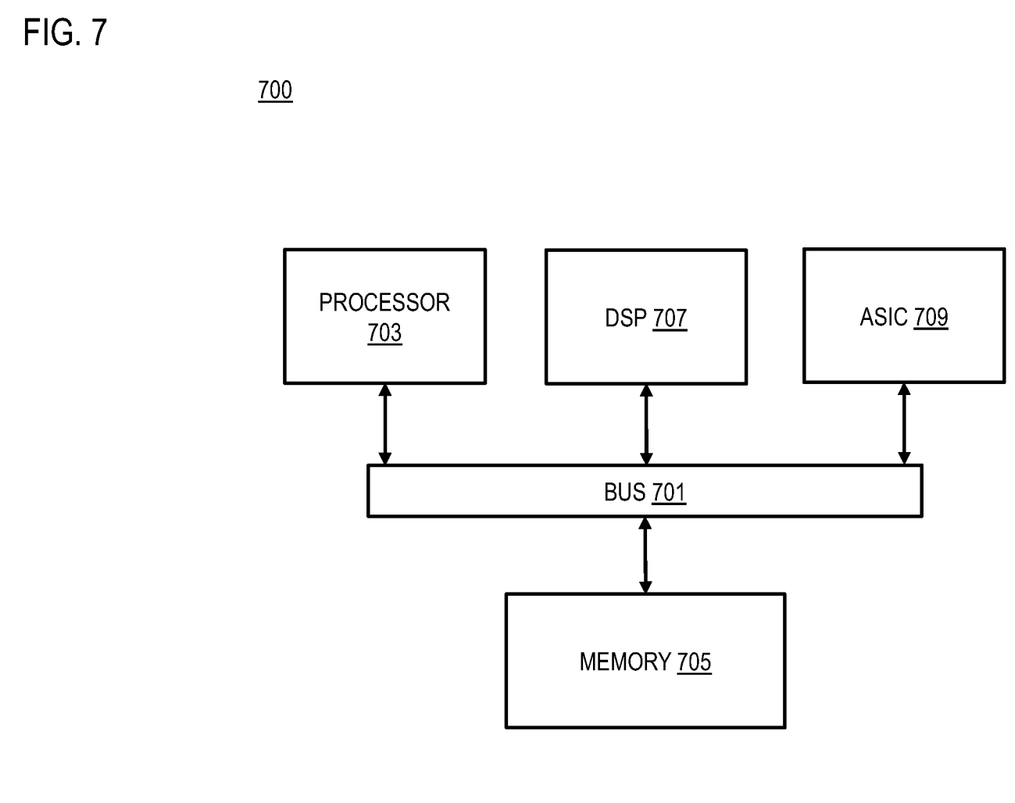
FIG. 7 is a diagram of a chip set that can be used to implement an embodiment.

FIG. 3 is a flowchart of a process for managing a wireless network access point beacon to enable efficient wireless network access point discovery and initial link setup, according to one embodiment. In one embodiment, the beacon management platform 103 performs the process 300 and is implemented in, for instance, a chip set including a processor and a memory as shown in FIG. 7. In step 301, the beacon management platform determines to one or more of (1) cause, at least in part, a beacon pointer associated with a beacon of a wireless network access point 107 to be transmitted and (2) cause, at least in part, a beacon schedule associated with the beacon of the wireless network access point 107 to be adjusted based, at least in part, on a derivation of one or more other beacon schedules associated with one or more other beacons of one or more other wireless network access points 107. The beacon pointer is transmitted based, at least in part, on a determined wireless medium occupancy level, and the determination to cause the adjustment of the beacon schedule is based, at least in part, on one or more of a determined conflicting beacon schedule and a received indication of a potential conflict between the beacon and the one or more other beacons. If the beacon pointer is determined to be transmitted based on a preference setting or instruction, then the process skips to step 307.

Then, in step 303, the beacon management platform 103 determines an average signaling rate and processes the average signaling rate to determine if the signaling rate meets a predetermined criteria. Next, in step 305, the beacon management platform 103 causes, at least in part, the occupancy level of the wireless medium to be determined based, at least in part, on a determination that the average signaling rate fails to meet the predetermined criteria. But, if an average broadcast and multicast signaling rate is determined to meet the predetermined criteria, any current transmitted beacons may continue to be transmitted without transmitting a beacon pointer.

Based on a determination that the occupancy level of the wireless medium is below a threshold level, the process continues to step 307 in which the beacon management platform 103 causes, at least in part, the beacon pointer to be transmitted. Or, based on a determination that the occupancy level of the wireless medium is above a threshold level, the process continues to step 309 in which the beacon management platform 103 causes, at least in part, a probability that the beacon pointer is to be transmitted to be increased.

If the beacon management platform 103 determines, based on the determined conflicting beacon schedule and/or the received indication that a beacon conflict may occur or has occurred in step 301, and the beacon management platform 103 causes the beacon schedule to be adjusted accordingly, and the process continues to step 311 in which the beacon management platform 103 causes, at least in part, an indication of the alignment of the beacon schedule with the one or more other beacon schedules to be transmitted. However, if no potential beacon conflict is indicated, then the current beacon schedule remains.

Next, in step 313, the beacon management platform 103 determines a reception schedule of a UE 101 in communication with the wireless network access point. Then, in step 315, the beacon management platform 103 causes, at least in part, the UE 101 to modify the reception schedule based, at least in part, on the indication of the alignment of the beacon schedule.

Following the conclusion of one or both of steps 307 and 315, the process 300 restarts for another beacon cycle. If, for example, the beacon management platform 103 determines to increase the probability that a beacon pointer be transmitted using existing traffic frames, the beacon management platform 103 uses this determination during each successive cycle of the process 300 so that the probability increase affects the determination at step 305 to eventually lower the determined wireless occupancy level on successive beacon cycles.

Figure 4:
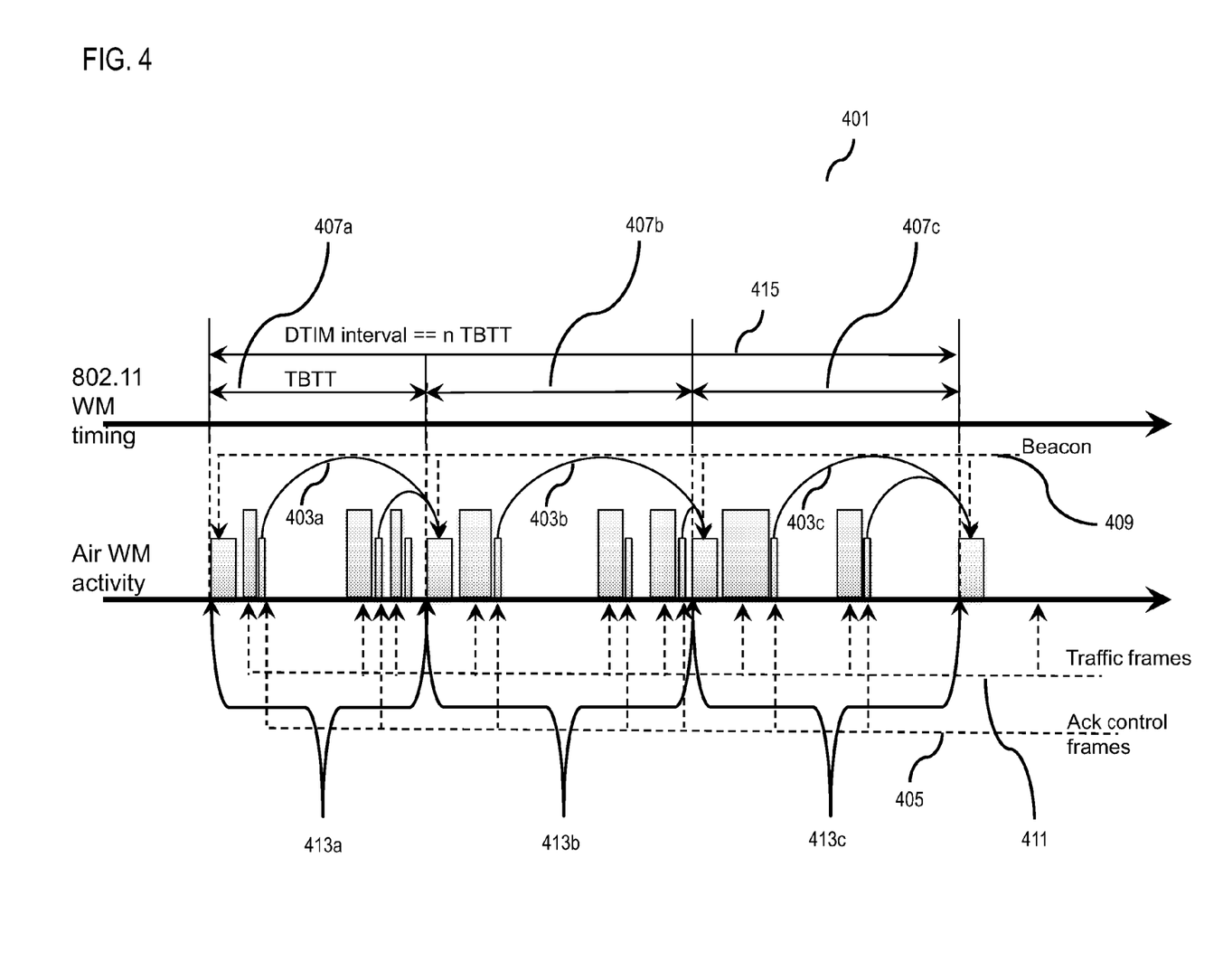
FIG. 4 is a diagram of a beacon pointer transmission, according to one embodiment.

FIG. 4 is a diagram of an example embodiment of a beacon cycle 401 being transmitted by a wireless network access point 107 having one or more beacon pointers 403a-403c (collectively referred to as beacon pointer 403) transmitted by way of one or more acknowledgement messages 405 that occur during any of target beacon transmission times 407a-407c (collectively referred to as target beacon transmission time 407). The target beacon transmission time 407 is a scheduled time period between beacons 409 as the beacons 409 are transmitted during the beacon cycle 401. Various traffic frames 411, as discussed above, also occur during the target beacon transmission time 407. While this example illustrates the beacon pointers 403 being associated with the acknowledgement messages 405, the beacon pointers 403 may additionally, or alternatively, be associated with any of the traffic frames 411 as well.

The beacon management platform 103, discussed above, considers at least all of the beacons 409, the acknowledgement messages 405 and the traffic frames 411 when determining the wireless medium occupancy 413a-413c (collectively referred to as wireless medium occupancy 413) in the corresponding target beam transmission time 407. The beacon management platform 103 also causes a beacon pointer 403 to be transmitted so as to provide information regarding a subsequent beacon 409 that may occur later in the beacon cycle 401. In this example, the beacon management platform 103 has caused the acknowledgement messages 405 and the traffic frames 411 to be utilized to transmit the beacon pointer 403 indicating transmit timing information or timing offset of the beacon 409, for example, with a probability adjustment of this occurrence being 6/8 target beam transmission time 407 intervals. This means that for every 8 target beam transmission time intervals 407, the beacon pointer 403 will be added to any of the acknowledgement messages 405 and/or the traffic frames 411. The probability factor may be any ratio ranging from near 0:1 to 1:1 depending on any wireless medium occupancy level determined by the beacon management platform 103. The beacon cycle 401 is associated with a beacon schedule, and the beacon management platform 103 effects the transmission of the beacon pointers 403 as needed for any specified delivery traffic indication map interval 415 having any n number target beacon transmission times 407 for its sample subset and/or range of influence on the transmission of the beacon pointers 403.

Figure 5:
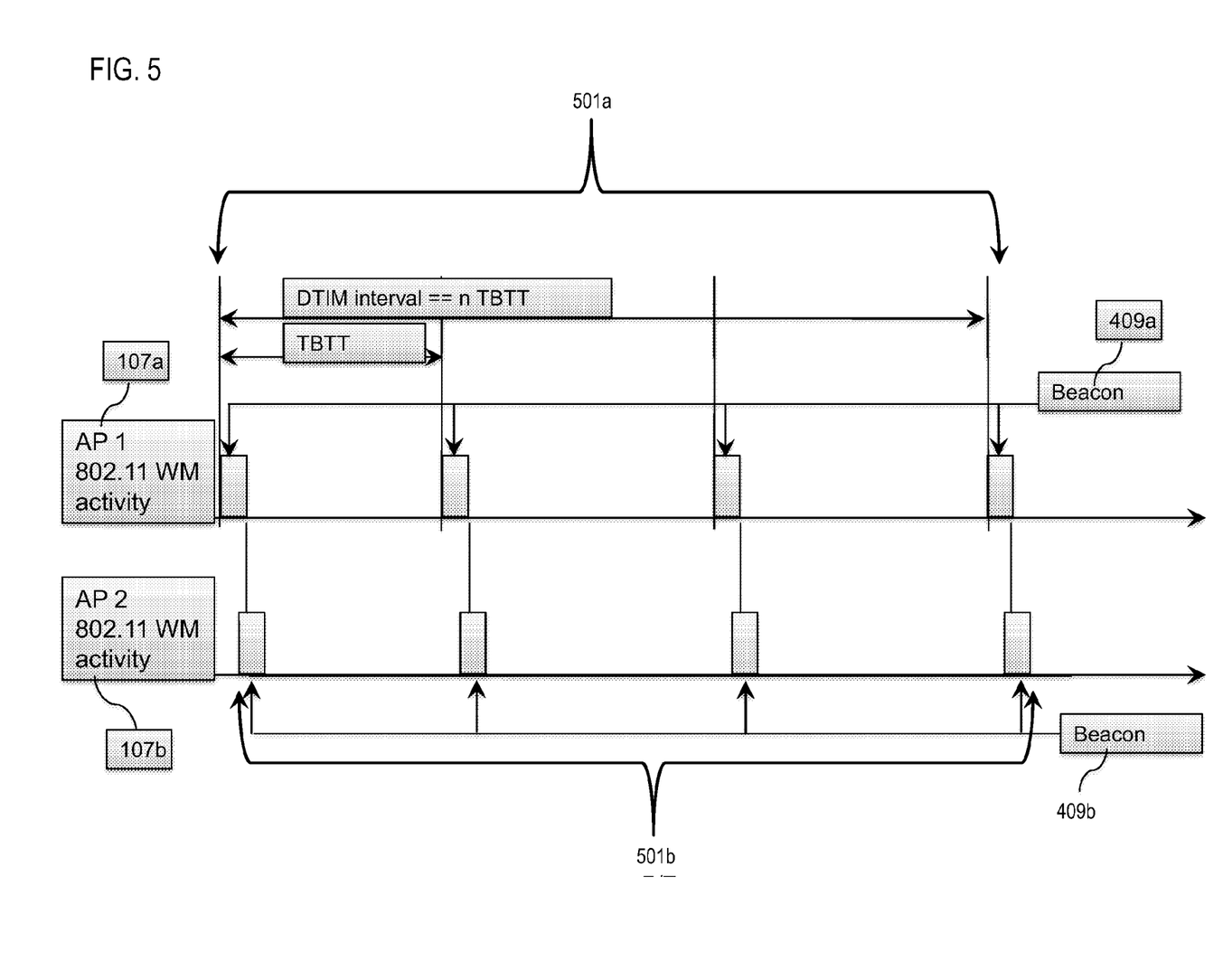
FIG. 5 is a diagram of a determined beacon collision, according to one embodiment.

FIG. 5 is a diagram of an example embodiment in which a UE 101 discussed above determines that one or more beacons 409 are about to conflict with one another. In this example, a first beacon 409a having a first beacon schedule 501a of a first wireless network access point 107a slightly overlaps a second beacon schedule 501b of another wireless network access point 107b. Beacon schedules 501a and 501b may be collectively referred to as beacon schedule 501. Additionally, though this example illustrates only two wireless network access points 107, the example could be expanded to encompass any number of wireless network access points 107 in other embodiments. Based on a determination that the first beacon schedule 501a and the second beacon schedule 501b may potentially collide or have already collided/conflicted, the UE 101 indicates this potential collision to the beacon management platform 103, discussed above, to adjust the beacon schedule 501 of one or more of the first wireless network access point 107a and the second wireless network access point 107b.

Figure 6:
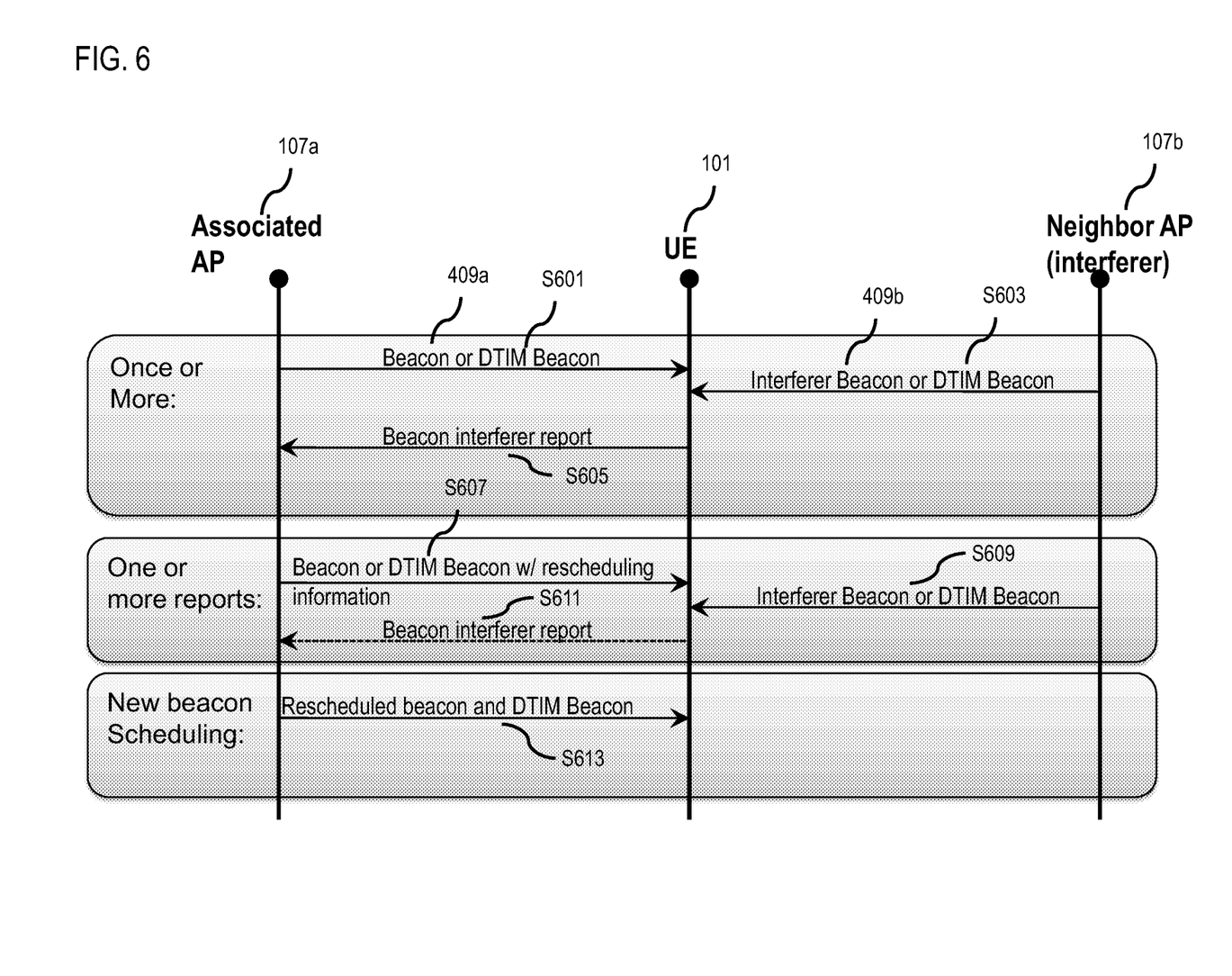
FIG. 6 is a diagram of a process for modifying a beacon schedule, according to one embodiment.

FIG. 6 is a process diagram of a method for aligning a first beacon schedule 501a associated with a first wireless network access point 107a with a second beacon schedule 501b associated with a second wireless network access point 107b. Each of the wireless network access points 107 are detectable by a UE 101.

In this example, the UE 101 receives a first beacon 409a, discussed above, from the first wireless network access point 107a in step S601. Then, in step S603 which may occur at the same time, or after step S601, the UE 101 receives a second beacon 409b from the second wireless network access point 107b. The UE 101, indicates to the beacon management platform 103, discussed above, that there is an interfering beacon, i.e. the second beacon 409b that either has collided/conflicted with the first beacon 409a, by sending a beacon interference report in step S605. The UE 101 and/or the beacon management platform 103 may be outfitted with a tolerance module that determines if the amount of conflict or closeness of conflict is above a threshold level before transmitting the indication to the beacon management platform 103 which may be associated with the first wireless network access point 107a, for example.

In this example, the beacon management platform 103, in step S607, causes the first wireless network access point 107a to provide rescheduling information to the UE 101 along with a next transmission of its beacon 409a indicating a potential change of its beacon schedule 501a, discussed above. The UE 101 receives a next beacon transmission of the second beacon 409b from the second wireless network access point 107b in step S609. The UE 101 then transmits another indication of the interference in step S611 to the beacon management platform 103 by way of an interference report indicating that the amount of conflict or closeness of conflict is above the threshold level. Steps S607, S609 and S611 may continually repeat until the rescheduled first beacon 409a is adjusted to a point such that the conflict threshold level is not breached on a subsequent potential rescheduled beacon schedule 501a.

Then, in step S613, if the interferer report indicates that the threshold value for the conflict is not breached, then the beacon management platform 103 causes the first wireless network access point 107a to change its beacon schedule 501a, discussed above, in view of the indications of the potential collision from the UE 101 that are based, at least in part, on the beacon schedule 501b of the second wireless network access point 107b beacons 409b and the interferer report.

The processes described herein for managing a wireless network access point beacon to enable efficient wireless network access point discovery and initial link setup may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 7 illustrates a chip set or chip 700 upon which an embodiment may be implemented. Chip set 700 is programmed to manage a wireless network access point beacon to enable efficient wireless network access point discovery and initial link setup as described herein may include, for example, bus 701, processor 703, memory 705, DSP 707 and ASIC 709 components.

The processor 703 and memory 705 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of managing a wireless network access point beacon to enable efficient wireless network access point discovery and initial link setup.

In one or more embodiments, the chip set or chip 700 includes a communication mechanism such as bus 701 for passing information among the components of the chip set 700. Processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one or more embodiments, the processor (or multiple processors) 703 performs a set of operations on information as specified by computer program code related to managing a wireless network access point beacon to enable efficient wireless network access point discovery and initial link setup. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 701 and placing information on the bus 701. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 703, such as a sequence of operation codes, constitute processor instructions, also called computer system instructions or, simply, computer instructions. Processors may be implemented as mechanical, electrical, magnetic, optical, chemical or quantum components, among others, alone or in combination.

The processor 703 and accompanying components have connectivity to the memory 705 via the bus 701. The memory 705 may include one or more of dynamic memory (e.g., RAM, magnetic disk, writable optical disk, etc.) and static memory (e.g., ROM, CD-ROM, etc.) for storing executable instructions that when executed perform the inventive steps described herein to manage a wireless network access point beacon to enable efficient wireless network access point discovery and initial link setup. The memory 705 also stores the data associated with or generated by the execution of the inventive steps.

In one or more embodiments, the memory 705, such as a random access memory (RAM) or any other dynamic storage device, stores information including processor instructions for managing a wireless network access point beacon to enable efficient wireless network access point discovery and initial link setup. Dynamic memory allows information stored therein to be changed by system 100. RAM allows a unit of information stored at a location called a memory address to be stored and retrieved independently of information at neighboring addresses. The memory 705 is also used by the processor 703 to store temporary values during execution of processor instructions. The memory 705 may also be a read only memory (ROM) or any other static storage device coupled to the bus 701 for storing static information, including instructions, that is not changed by the system 100. Some memory is composed of volatile storage that loses the information stored thereon when power is lost. The memory 705 may also be a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 703, including instructions for execution. Such a medium may take many forms, including, but not limited to computer-readable storage medium (e.g., non-volatile media, volatile media), and transmission media. Non-volatile media includes, for example, optical or magnetic disks. Volatile media include, for example, dynamic memory. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

While a number of embodiments and implementations have been described, the disclosure is not so limited but covers various obvious modifications and equivalent arrangements, which fall within the purview of the appended claims. Although features of various embodiments are expressed in certain combinations among the claims, it is contemplated that these features can be arranged in any combination and order.

What is claimed is:

1. A method comprising:
    determining to one or more of (1) cause, at least in part, a beacon pointer associated with a beacon of a wireless network access point to be transmitted and (2) cause, at least in part, a beacon schedule associated with the beacon of the wireless network access point to be adjusted based, at least in part, on a derivation of one or more other beacon schedules associated with one or more other beacons of one or more other wireless network access points to avoid a conflict between the beacon schedule and the one or more other beacon schedules,
    wherein the determination to cause the adjustment of the beacon schedule is based, at least in part, on one or more of a determined conflicting beacon schedule and a received indication of a potential conflict between the beacon and the one or more other beacons;
    determining an average signaling rate;
    processing the average signaling rate to determine if the signaling rate meets a predetermined criteria; and
    causing, at least in part, the occupancy level of the wireless medium to be determined based, at least in part, on a determination that the average signaling rate fails to meet the predetermined criteria;
    wherein the indication of the potential conflict between the beacon and the one or more other beacons is received by way of a mobile device in communication with the wireless network access point and one or more of (1) at least one of the one or more other wireless network access points and (2) another mobile device in communication with at least one of the one or more other wireless network access points;
    wherein the beacon pointer is transmitted by way of shared channel arbitration transmitting broadcast signaling or by way of unicast addressed frames.

2. A method of claim 1, wherein the beacon pointer is transmitted based, at least in part, on a determined wireless medium occupancy level.

3. A method of claim 2, further comprising:
    causing, at least in part, the beacon pointer to be transmitted based on a determination that the occupancy level of the wireless medium is below a threshold level.

4. A method of claim 2, further comprising:
    causing, at least in part, a probability that the beacon pointer is to be transmitted to be increased based on a determination that the occupancy level of the wireless medium is above a threshold level.

5. A method of claim 1, wherein the beacon pointer comprises one or more of beacon scheduling information and beacon signaling information.

6. A method of claim 1, wherein the beacon pointer is transmitted by way of an acknowledgement message or a broadcast message.

7. A method of claim 1, wherein the beacon pointer is transmitted by way of unicast addressed frames.

8. A method of claim 7, wherein the unicast addressed frames comprise one or more of downlink unicast frames and uplink unicast frames.

9. A method of claim 1, wherein the wireless network access point and the one or more other wireless network access points are isolated from direct communication between one another.

10. A method of claim 1, wherein the indication of the potential conflict between the beacon and the one or more other beacons comprises one or more of an average timing gap between the beacon and the one or more other beacons, a carrier to interferer signal ratio between the wireless network access point and the one or more other wireless network access points, one or more radio signal strengths respectively associated with the one or more other wireless network access points, one or more service set identifications respectively associated with the one or more other wireless network access points, one or more basic service set identifications respectively associated with the one or more other wireless network access points, and one or more identifiers respectively associated with the one or more other wireless network access points.

11. A method of claim 1, further comprising:
causing, at least in part, an indication of the adjustment of the beacon schedule to be transmitted.

12. A method of claim 11, further comprising:
determining a reception schedule of a mobile device in communication with the wireless network access point; and
causing, at least in part, the mobile device to modify the reception schedule based, at least in part, on the indication of the adjustment of the beacon schedule.

13. An apparatus comprising:
at least one processor; and
at least one memory including computer program code for one or more programs,
the at least one memory and the computer program code configured to, with the at least one processor, cause the apparatus to perform at least the following:
determine to one or more of (1) cause, at least in part, a beacon pointer associated with a beacon of a wireless network access point to be transmitted and (2) cause, at least in part, a beacon schedule associated with the beacon of the wireless network access point to be adjusted based, at least in part, on a derivation of one or more other beacon schedules associated with one or more other beacons of one or more other wireless network access points to avoid a conflict between the beacon schedule and the one or more other beacon schedules,
wherein the determination to cause the adjustment of the beacon schedule is based, at least in part, on one or more of a determined conflicting beacon schedule and a received indication of a potential conflict between the beacon and the one or more other beacons;
determine an average signaling rate;
process the average signaling rate to determine if the signaling rate meets a predetermined criteria; and
cause, at least in part, the occupancy level of the wireless medium to be determined based, at least in part, on a determination that the average signaling rate fails to meet the predetermined criteria;
wherein the indication of the potential conflict between the beacon and the one or more other beacons is received by way of a mobile device in communication with the wireless network access point and at least one of the one or more other wireless network access points;
wherein the beacon pointer is transmitted by way of shared channel arbitration transmitting broadcast signaling or by way of unicast addressed frames.

14. An apparatus of claim 13, wherein the beacon pointer is transmitted based, at least in part, on a determined wireless medium occupancy level.

15. An apparatus of claim 14, wherein the apparatus is further caused to:
cause, at least in part, the beacon pointer to be transmitted based on a determination that the occupancy level of the wireless medium is below a threshold level.

16. An apparatus of claim 14, wherein the apparatus is further caused to:
cause, at least in part, a probability that the beacon pointer is to be transmitted to be increased based on a determination that the occupancy level of the wireless medium is above a threshold level.

17. An apparatus of claim 13, wherein the beacon pointer comprises one or more of beacon scheduling information and beacon signaling information.

18. An apparatus of claim 13, wherein the beacon pointer is transmitted by way of an acknowledgement message.

19. An apparatus of claim 13, wherein the beacon pointer is transmitted by way of unicast addressed frames.

20. An apparatus of claim 19, wherein the unicast addressed frames comprise one or more of downlink unicast frames and uplink unicast frames.

21. An apparatus of claim 13, wherein the wireless network access point and the one or more other wireless network access points are isolated from direct communication between one another.

22. An apparatus claim 13, wherein the indication of the potential conflict between the beacon and the one or more other beacons comprises one or more of an average timing gap between the beacon and the one or more other beacons, a carrier to interferer signal ratio between the wireless network access point and the one or more other wireless network access points, one or more radio signal strengths respectively associated with the one or more other wireless network access points, one or more service set identifications respectively associated with the one or more other wireless network access points, one or more basic service set identifications respectively associated with the one or more other wireless network access points, and one or more identifiers respectively associated with the one or more other wireless network access points.

23. An apparatus claim 13, wherein the apparatus is further caused to:
cause, at least in part, an indication of the adjustment of the beacon schedule to be transmitted.

24. An apparatus of claim 23, wherein the apparatus is further caused to:
determine a reception schedule of a mobile device in communication with the wireless network access point; and
causing, at least in part, the mobile device to modify the reception schedule based, at least in part, on the indication of the adjustment of the beacon schedule.

25. A non-transitory computer-readable storage medium carrying one or more sequences of one or more instructions which, when executed by one or more processors, cause an apparatus to at least perform the following:
determine to one or more of (1) cause, at least in part, a beacon pointer associated with a beacon of a wireless network access point to be transmitted and (2) cause, at least in part, a beacon schedule associated with the beacon of the wireless network access point to be adjusted based, at least in part, on a derivation of one or more other beacon schedules associated with one or more other beacons of one or more other wireless network access points to avoid a conflict between the beacon schedule and the one or more other beacon schedules,
wherein the determination to cause the adjustment of the beacon is based, at least in part, on one or more of a determined conflicting beacon schedule and a received indication of a potential conflict between the beacon and the one or more other beacons;
determine an average signaling rate;
process the average signaling rate to determine if the signaling rate meets a predetermined criteria; and
cause, at least in part, the occupancy level of the wireless medium to be determined based, at least in part, on a determination that the average signaling rate fails to meet the predetermined criteria;
wherein the indication of the potential conflict between the beacon and the one or more other beacons is received by way of a mobile device in communication with the wireless network access point and at least one of the one or more other wireless network access points;
wherein the beacon pointer is transmitted by way of shared channel arbitration transmitting broadcast signaling or by way of unicast addressed frames.

26. A non-transitory computer-readable storage medium of claim 25, wherein the beacon pointer is transmitted based, at least in part, on a determined wireless medium occupancy level.

27. A non-transitory computer-readable storage medium of claim 26, wherein the apparatus is further caused to:
cause, at least in part, the beacon pointer to be transmitted based on a determination that the occupancy level of the wireless medium is below a threshold level.

28. A non-transitory computer-readable storage medium of claim 26, wherein the apparatus is further caused to:
cause, at least in part, a probability that the beacon pointer is to be transmitted to be increased based on a determination that the occupancy level of the wireless medium is above a threshold level.

29. A non-transitory computer-readable storage medium of claim 25, wherein the beacon pointer comprises one or more of beacon scheduling information and beacon signaling information.

30. A non-transitory computer-readable storage medium of claim 25, wherein the beacon pointer is transmitted by way of an acknowledgement message.

31. A non-transitory computer-readable storage medium of claim 25, wherein the beacon pointer is transmitted by way of unicast addressed frames.

32. A non-transitory computer-readable storage medium of claim 31, wherein the unicast addressed frames comprise one or more of downlink unicast frames and uplink unicast frames.

33. A non-transitory computer-readable storage medium of claim 29, wherein the wireless network access point and the one or more other wireless network access points are isolated from direct communication between one another.

34. A non-transitory computer-readable storage medium of claim 25, wherein the indication of the potential conflict between the beacon and the one or more other beacons comprises one or more of an average timing gap between the beacon and the one or more other beacons, a carrier to interferer signal ratio between the wireless network access point and the one or more other wireless network access points, one or more radio signal strengths respectively associated with the one or more other wireless network access points, one or more service set identifications respectively associated with the one or more other wireless network access points, one or more basic service set identifications respectively associated with the one or more other wireless network access points, and one or more identifiers respectively associated with the one or more other wireless network access points.

35. A non-transitory computer-readable storage medium of claim 25, wherein the apparatus is further caused to:
cause, at least in part, an indication of the adjustment of the beacon schedule to be transmitted.

36. A non-transitory computer-readable storage medium of claim 35, wherein the apparatus is further caused to:
determine a reception schedule of a mobile device in communication with the wireless network access point; and
causing, at least in part, the mobile device to modify the reception schedule based, at least in part, on the indication of the adjustment of the beacon schedule.

\* \* \* \* \*